United States Patent
Nordquist et al.

(10) Patent No.: US 6,811,150 B2
(45) Date of Patent: Nov. 2, 2004

(54) HOLDER FOR ACCURATE POSITIONING OF A WORKPIECE

(75) Inventors: Hakon Nordquist, Täby (SE); Ake Hjalmarsson, Bromma (SE)

(73) Assignee: System 3R International AB, Vallingby (SE)

(*) Notice: Subject to any disclaimer, the term of this patent is extended or adjusted under 35 U.S.C. 154(b) by 151 days.

(21) Appl. No.: 09/779,612

(22) Filed: Feb. 9, 2001

(65) Prior Publication Data

US 2001/0005066 A1 Jun. 28, 2001

Related U.S. Application Data

(63) Continuation-in-part of application No. 09/550,051, filed on Apr. 14, 2000, now abandoned.

(30) Foreign Application Priority Data

Apr. 15, 1999 (DE) .......................................... 199 17 104
Oct. 16, 2000 (DE) .......................................... 100 51 268

(51) Int. Cl.⁷ .............................. B25B 1/22; B23Q 3/00
(52) U.S. Cl. ..................................... 269/71; 219/69.11
(58) Field of Search ....................... 219/69.11; 269/71, 269/97, 98, 224

(56) References Cited

U.S. PATENT DOCUMENTS 3,908,318 A * 9/1975 Wallin
4,309,849 A * 1/1982 Kowalski et al.
4,530,507 A * 7/1985 Lee, Jr.
4,711,135 A * 12/1987 Horiuchi et al.
4,786,776 A 11/1988 Ramsbro
4,855,558 A 8/1989 Ramsbro
4,900,888 A * 2/1990 Lee ........................ 219/69.11
4,925,168 A 5/1990 Ramsbro
5,019,129 A 5/1991 Johanson
5,494,269 A * 2/1996 McCalmont
5,769,561 A 6/1998 Pettersson
5,871,315 A * 2/1999 Burt et al.
6,007,252 A * 12/1999 Thelen et al.
6,103,987 A * 8/2000 Nordquist
6,113,056 A * 9/2000 Armstrong

FOREIGN PATENT DOCUMENTS

| | | |
|---|---|---|
| DE | 4104750 | 1/1992 |
| DE | 4139272 | 6/1993 |
| EP | 0255042 | 2/1988 |
| GB | 1051548 A * | 9/1964 |
| GB | 2224679 A * | 5/1990 |
| JP | 8-117968 A * | 5/1996 |
| SE | 665985 A5 * | 6/1988 |
| WO | WO-97/23320 A1 * | 7/1997 |

* cited by examiner

Primary Examiner—Geoffrey S. Evans
(74) Attorney, Agent, or Firm—Jacobson Holman PLLC (57) ABSTRACT

A holder for accurate positioning of a workpiece in the working area of a machine tool, especially an erosion machine, which includes a vibration damper to make the holder insensitive to vibrations such as those caused by variable rinse fluid pressure while machining the workpiece. At least one of the holder and workpiece is provided with a vibration damper.

4 Claims, 10 Drawing Sheets

HOLDER FOR ACCURATE POSITIONING OF A WORKPIECE

This is a continuing application from U.S. Ser. No. 09/550,051, filed Apr. 14, 2000, now abandoned, entitled Holder For Accurate Positioning Of A Workpiece, inventor Hakon Nordquist.

BACKGROUND OF THE INVENTION

The invention relates to a holder for accurate positioning of a workpiece in the working area of a machine tool, especially an erosion machine (e.g., electrical discharge machine or "EDM"). The holder includes attachment or fastening elements for attaching or fastening the holder for holding the workpiece to a fixed carrier structure and holding parts for holding the workpiece.

In the electromachining process of a workpiece it is necessary to remove from the immediate working area all of the ultrafine particles removed from the workpiece in order not to degrade the desired accuracy of the machining. To remove particles there is usually a water-based rinse fluid, aimed at the workpiece in the working arm. As the cutting speed increases, larger quantities of particulate powder have to be removed. Its removal requires that the rinse fluid pressure be increased.

The erosion process itself does not apply any force to the workpiece, because the erosion electrode, for example in the form of a cutting wire, does not make contact with the workpiece so that the workpiece position is not affected. In contrast, the increased, normally not exactly constant rinse fluid pressure acts directly on the workpiece and sets the workpiece oscillating in its holder, a state that degrades the accuracy of the workpiece position and thus the results of the workpiece machining.

To overcome this problem it is quite conceivable that the mass of the holder be enlarged beyond the conventional strength requirements. Then, however, the holder is unwieldy and reduces the working area.

The German patent document DE-A-41 39 272 discloses a sliding block with a supporting element, which is surrounded bypacking material made of non-metallic material, which is supposed to dampen sound and vibrations.

SUMMARY OF THE INVENTION

Various embodiments of the present invention are based on the problem of developing a holder which is insensitive to the rinse fluid pressure and does not restrict the working area. However, such pressure fluctuations, which act on the workpiece, can also occur during other machining processes of the workpiece, such as for example during the cutting or lapping operation of the workpiece. Such pressure fluctuations can be the reason for the workpiece to vibrate; and said vibration can propagate into said workpiece's holder and into the support structure. Therefore, the holder may be improved in such a manner that it is insensitive to pressure fluctuations.

The holder of the present invention exhibits, according to various embodiments of the invention, at least one vibration damper. It absorbs the vibration energy, transferred from the rinse fluid to the workpiece to such an extent that the accuracy of the workpiece position is no longer endangered. Moreover, the working area is not limited by the holder by the invention, because the vibration damper can be attached outside the working area.

If the vibration damper includes two parts, vibrating relative to each other, then these embodiments of the invention employ a first type of vibration damper, which is connected on both ends to the parts and thus dampens the relative movement of the parts to each other. Furthermore, its damping properties can be adjusted. Moreover, the vibration damper is provided with a spring constant. As its damping ability increases, the spring constant also increases. If the holder has such a vibration damper, the natural frequency of the holder increases with the workpiece attached to it. If the frequency of the excited vibration approximates the natural frequency, the vibration damper is adjusted in such a manner that the natural frequency is adjusted to be far away from the frequency of the excited vibration.

If one part is attached, for example, to a fixed wall, and projects from it and its free end bears the workpiece, another embodiment of the invention uses a second type of vibration damper. The excited vibrations subject the part to a pull and pressure load. Therefore, the vibration damper having an inherent damping property, for example in the form of rubber, is mounted on the outside of the part. Another group of appropriate vibration dampers is made of alloys (high damping capacity alloys=HDCM), which are usually based on chromium and iron alloys and can be sprayed expediently under negative pressure on the surface of the part or the holder. The thickness of the sprayed-on or deposited alloy coating can range from 2 to 3 mm.

This second type of vibration damper can be arranged between two parts, i.e., between two steel plates of a clamping device. In this case, the damping material is subjected predominantly to dynamically varying shear loads. Suitable embodiments of a vibration damper of the second type are insulating foils having high damping properties. One example is the insulating foil 2552, marketed by Minnesota Mining and Manufacturing Co., Saint Paul, Minn. Thus, one variation of the invention provides such an insulating foil between the work table and chuck as the special workpiece holder. In another embodiment of the invention, the damping material, for example, rubber, can be vulcanized on the bottom and upper plate of a leveling head, as disclosed in U.S. Pat. No. 5,769,561.

A third type of vibration damper contains a mass, for example, a steel ball, provided with damping material, on which rubber is vulcanized. In an advantageous design of the invention, the rubber body is affixed on the holder in the vicinity of the workpiece. The steel mass can be the holder itself, on whose one side the damping material is affixed. The natural frequency of the rubbery damping material is much lower than that of the holder. Hence, the vibration energy, transferred from the rinse fluid pressure to the holder, is absorbed largely by the damping material. If, on the other hand, the natural frequency of the damping material is about equal to one of the natural frequencies of the holder with the attached workpiece and these natural frequencies are to be damped, it vibrates in phase opposition. That is, it vibrates 180° out of phase with the holder, a feature that improves the absorption of the vibration energy of the holder owing to the damping material. One criteria of the invention is to provide for the attachment of an easily adjustable vibration damper.

Another embodiment of the invention provides a fourth type of vibration damper, which absorbs the vibration energy through friction between plates that are connected together and loaded in shear during vibration and of which two or more plates of the same size are screwed or cemented together forming a plate package. Optionally, another plate having a higher coefficient of friction can be inserted between the plates of the package.

Therefore, the invention provides for the holder having different types of vibration dampers depending on the specific design or use of the holder. In this respect, the vibration damper can have advantageously adjustable spring and damping constants.

Another solution of the problem on which the invention is based provides a laminated holder, whose metal sheets are permanently connected together. The adjacent faces of the metal sheets are provided with an expediently higher coefficient on friction. The vibrations exciting the holder cause the metal sheets to move relative to each other. The energy of the relative movement is absorbed by the friction of the metal sheets. The consequence is also a damping of the vibration.

Other embodiments for a holder for exact positioning of a workpiece in the working area of a machine tool, in particular an erosion machine, which exhibits fastening elements for fastening to a stationary support structure and/or fastening or positioning at least temporarily a workpiece at the holder, the invention embodiments provide that there be not only a vibration damper but also at least one area where the holder and the support structure and/or the holder and the workpiece make direct contact. Thus, an attachment of the holder to the support structure and/or to the workpiece is created that is hard to some extent and to some extent designed to damp the vibration by means of the intercalated vibration damper.

In a preferred design of these embodiments of the invention, the area can completely envelop the vibration damper, for example, in the shape of a ring.

In another alternative of these embodiments, there are several spaced areas that are disposed in the four corners in, for example, a holder with a rectangular shape. It is then expedient to screw the holder in the four corner areas together with the support structure and/or the workpiece.

In another design of these invention embodiments, recesses, which receive at least partially the vibration damper, can be formed in at least one of the surfaces that face each other and belong to the holder and/or the support structure and/or the workpiece.

Furthermore, it is advantageous in these latter embodiments for the vibration damper to be made of several sandwich-like connected layers, which exhibit different damping properties. Expediently the effect of the vibration damper can be adjusted, for example, by means of a stationary plate, which is put on the vibration damper and is subjected to the action of adjustable pressure by means of at least one setscrew. Instead of the setscrew, the plate can also be subjected to the action of hydraulic pressure. As an alternative, shims with different damping properties can be inserted.

BRIEF DESCRIPTION OF THE DRAWINGS

Preferred designs of the invention are also apparent from the dependent claims. The various embodiments of the invention are explained in detail below with reference to the attached drawings.

DETAILED DESCRIPTION OF THE INVENTION

Figure 1:
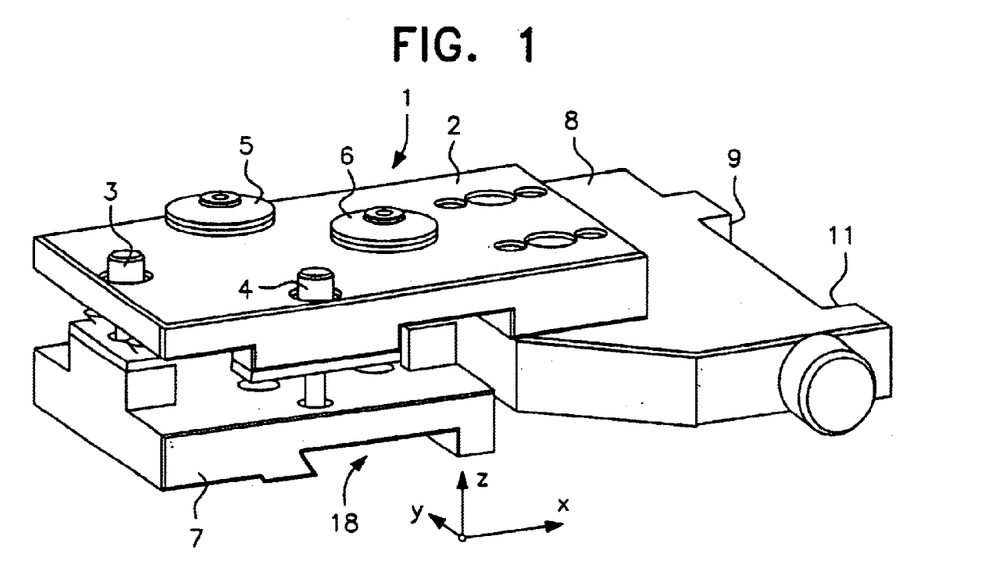
FIG. 1 is a perspective view of a holder in the form of a leveling head.

The leveling head 1, according to FIG. 1, is described in detail in U.S. Pat. No. 5,769,561 so that reference is made here explicitly to the explanation therein.

The leveling head 1 exhibits an upper part 2, which can be leveled in the z direction relative to a lower part 7 with adjusting screws 3, 4, moved in the x-y plane, against a prestress generated by two sets of springs 5, 6, which can also be moved in this plane. In front of the lower part 7 a precision vise 8, according to U.S. Pat. No. 4,925,168, is attached to the upper part 2. Between its jaws 9, 11, a workpiece (not illustrated in FIG. 1) can be clamped. The upper part 2 with the precision vise 8 forms, according to the invention, a holder for the workpiece 15 (FIG. 11), which is to be positioned accurately in the x, y and z direction of the working area 16 of a wire erosion machine 13, 14 for machining with the erosion wire 12.

In the embodiment shown here, the underside of the lower part 7 is provided with a dovetail profile 18 so that it can be accurately positioned in the x direction and in the z direction, which is perpendicular to said x direction and parallel to the direction of the erosion wire 12, on a fixed carrier structure (not illustrated) of the kind disclosed in U.S. Pat. No. 4,786,776, which exhibits a dovetail counter profile. Furthermore, the carrier structure exhibits a stop, which also allows an accurate positioning of the lower part 7 in the y direction..

Not illustrated in the figures is the rinse fluid and its infeed and outlet to the working area 16. In any case, it washes around the workpiece 15 at high pressure along the cut 17, which the erosion wire 12 executes at the workpiece 15.

According to various embodiments of the invention, the holder 10 is provided with one or multiple vibration damper (s). In the first embodiment shown in FIG. 2, the upper part 2 exhibits in the z direction two tapholes 20, 22 that are spaced apart in the y direction. Each of these two tapholes 20, 22 can have a vibration damper of the first type either in the embodiment according to FIG. 3 or in the embodiment according to FIG. 4.

Figure 3:
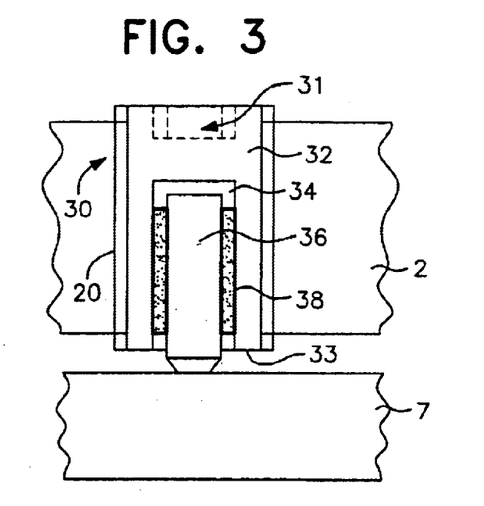
FIG. 3 is a schematic drawing of a segment of the leveling head, according to FIG. 2, with a first embodiment of a vibration damper of the first type.

In the embodiment according to FIG. 3, the vibration damper 30 of the first type comprises a screw 32, which is provided with an external thread and internal hexagonal recess 31 in its upper upper, which is drilled starting from the underside 33 opposite the internal hexagonal recess 31 in order to form a blind hole 34. Into the blind hole 34 is inserted a cylindrical bolt 36, which rests against the top side of the lower part 7 and is permanently connected with a screw 32 through a damper 38. The damper 38 is made of a rubbery material and is cemented to both the inside surface of the blind hole 34 and also the outer surface of the cylindrical bolt 36. As one can see, the entire length of the screw 32 can be screwed into the hole 20 or 22. The damper 38, loaded in shear during vibrations, can absorb the vibration energy, transferred through the rinse fluid to the holder 10, owing to its elasticity so that the holder 10 does not vibrate.

Figure 4:
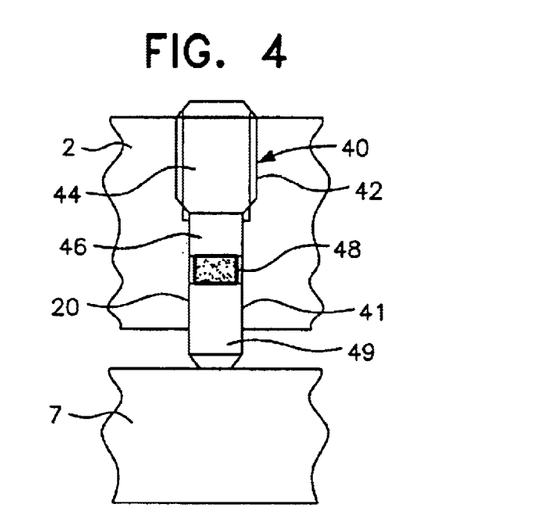
FIG. 4 is a schematic drawing of a detail of a leveling head, according to FIG. 2, with a second embodiment of a vibration damper of the first type.

In the embodiment according to FIG. 4, the vibration damper 40 of the first kind has the shape of a bolt 42, whose head 44 has an external thread and whose shaft 46, which is tapered somewhat relative to the head 44, is shortened. A damper 48 made of rubbery material is cemented to the free face of the shaft 46. In the unstressed state, the damper has a somewhat smaller diameter than the shaft 46. A pin 49 is cemented on the free underside of the damper 48. The pin has the same diameter as the shaft and its length is dimensioned so that projecting from the underside of the upper part 2 it can rest against the top side of the lower part 7. The damper 48 has the same energy absorbing properties as the damper 38. An internal hexagonal recess on the bolt head 44 is not shown. If the bolt 42 is screwed further into the passage bore 20 than shown, the cross section of the damper 48 enlarges so that its spring constant and its damping coefficient change. Thus, the properties of the damper 48 can be adjusted by means of the bolt 42. The vibration damper 40 is especially suitable for such passage boreholes 20, 22, where only the upper segment is provided with an internal thread, which continues toward the bottom in an internal smooth cylindrical hole segment 41.

Figure 5:
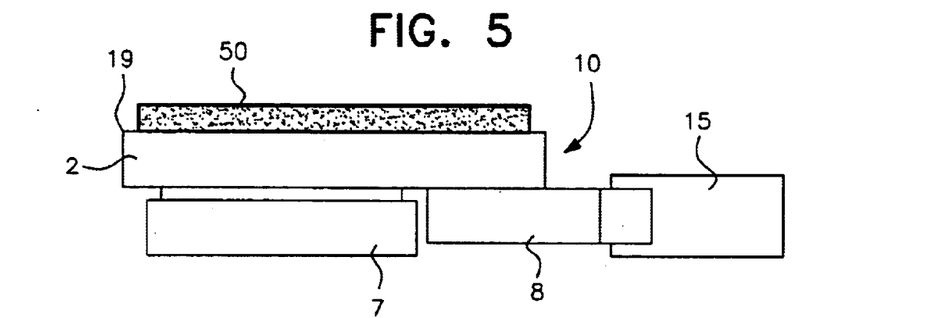
FIG. 5 is a schematic drawing of a side view of another embodiment of a leveling head with a vibration damper of the second type.
Figure 6:
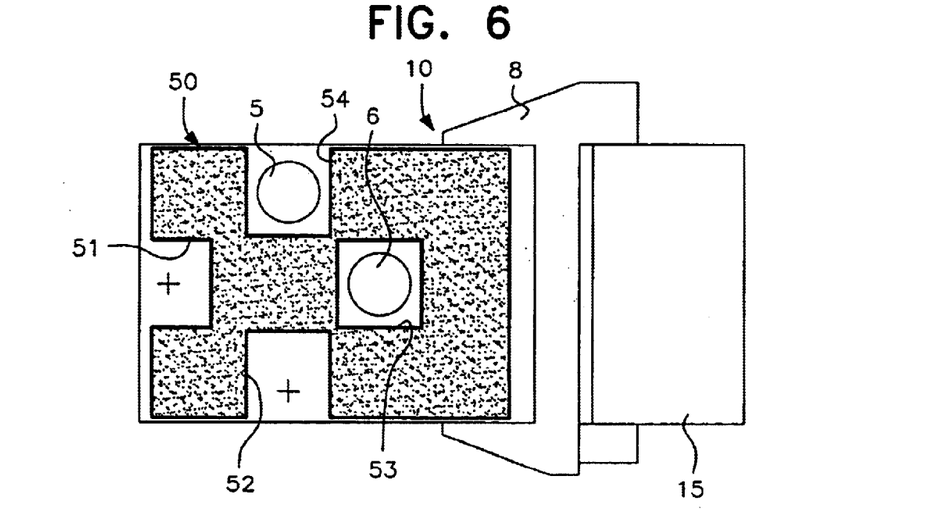
FIG. 6 is a schematic drawing of a top view of the leveling head, according to FIG. 5.

In the embodiment of the invention according to FIGS. 5 and 6, a mat 50 made of a rubbery, vibration absorbing material of a vibration damper of the second type is affixed on the top side 19 of the upper part 2 and permanently connected to the upper part 2 by cementing or vulcanizing.

For the adjusting screws 3, 4 and the set of springs 5, 6 the mat 50 has recesses 51, 52, as well as 53 and 54. This mat 50 has about one-third the thickness of the upper part 2. However, the choice of thickness is not subject to any limitation. As an alternative to affixing a rubbery material, an HDCM alloy can be sprayed, as stated above, on the top side 19.

Figure 7:
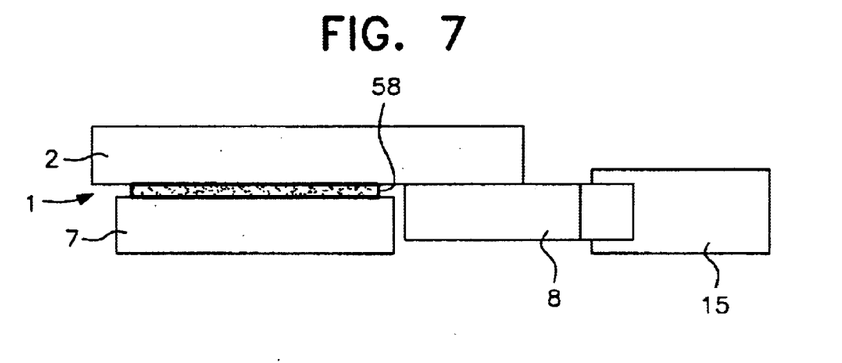
FIG. 7 is a schematic drawing of a side view of another embodiment of a leveling head with a vibration damper of the second type.

FIG. 7 depicts another embodiment of a vibration damper of the second type. The leveling head 1 exhibits again an upper part 2, to which the vise 8 with the workpiece 15 is attached, and a lower part 7. The vibration damper 58 of the second type includes an insulating material, such as rubber, which is vulcanized in an expedient manner to the underside of the upper part 2 and to the top side of the lower part 7. Moreover, the leveling head corresponds to the one depicted in FIG. 1.

Figure 8:
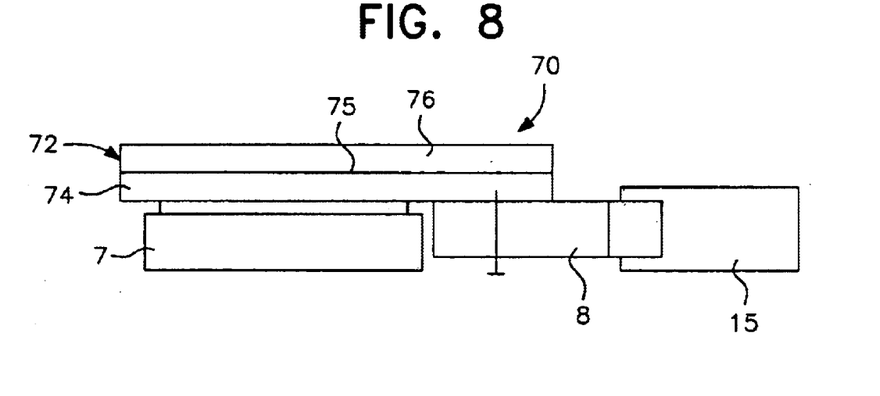
FIG. 8 is a schematic drawing of a side view of a leveling head with another vibration damper of the second type.

Another embodiment of a vibration damper of the second type is depicted in FIG. 8. Here the upper part 72 of the leveling head 70, which is described as one part in the embodiments described above, is segmented in the x-y plane into two advantageously equally large plates 74, 76, which are connected by means of screws. Between these plates rubber or an insulating foil 75, for example, the aforementioned foil 2552, is inserted as the insulating material. The lower part and the vise 8, which is attached to the upper part 72 and holds the workpiece 15, are analogous to the previously described designs.

Figure 9:
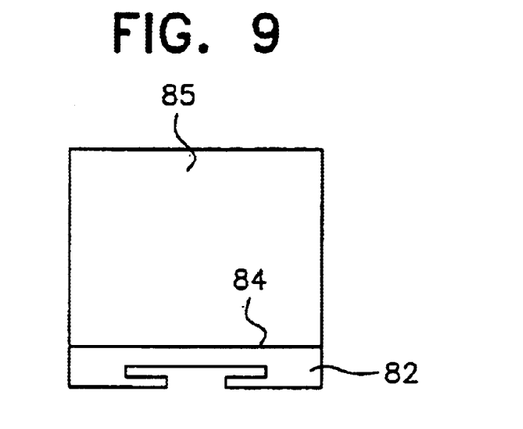
FIG. 9 is a schematic drawing of a side view of a holder with workpiece and a vibration damper of the second type.
Figure 10:
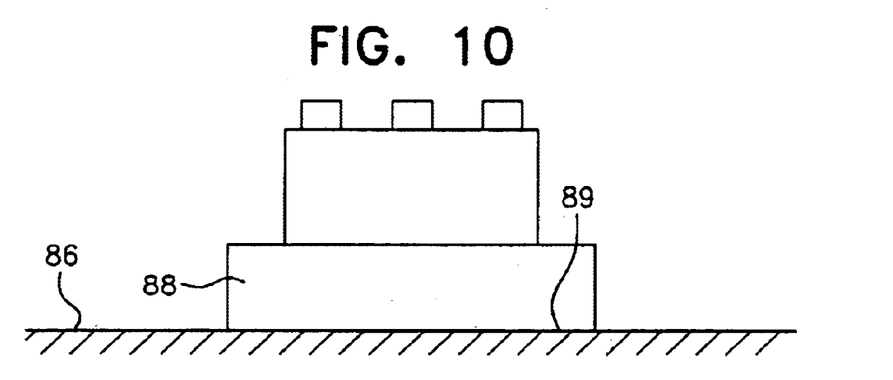
FIG. 10 is a schematic side view of a machine chuck, which is mounted on a work table and exhibits a vibration damper of the second type.

Two other examples of a vibration damper of the second type are depicted in FIGS. 9 and 10. According to FIG. 9, a workpiece 85 is fastened to the underside of a holder 82. In so doing, insulating material, for example, one of the aforementioned insulating foils 84, is inserted, for example, cemented, between workpiece 85 and holder 82. The workpiece 85 is screwed together with the holder 82. FIG. 10 indicates a work table 86, on which a machine chuck 88 is attached as the holder for a workpiece (not illustrated) above an insulating foil 89 that is laid in-between.

Figure 11:
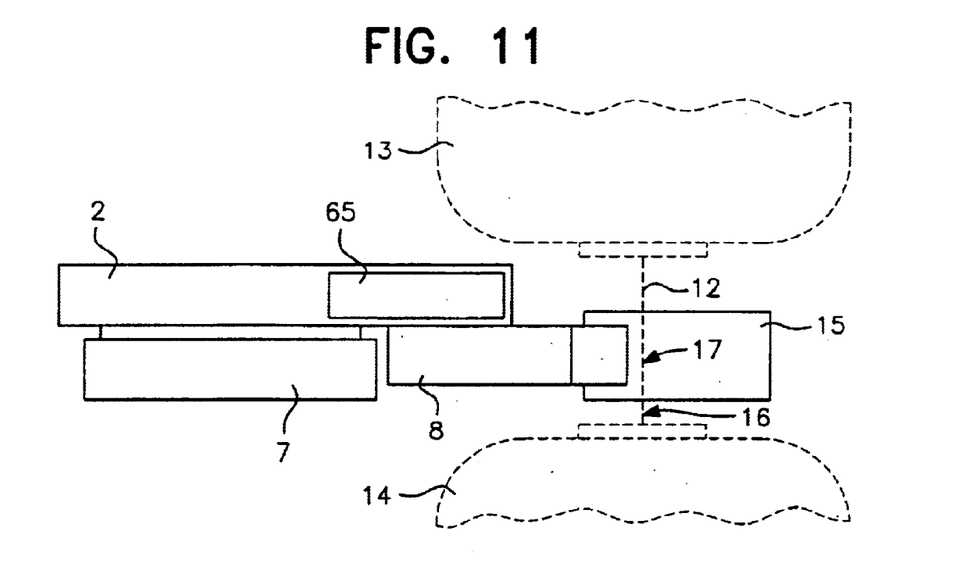
FIG. 11 is a schematic side view of a leveling head with a vibration damper of the third type with important parts of a wire erosion machine that are shown by the dotted line.
Figure 12:
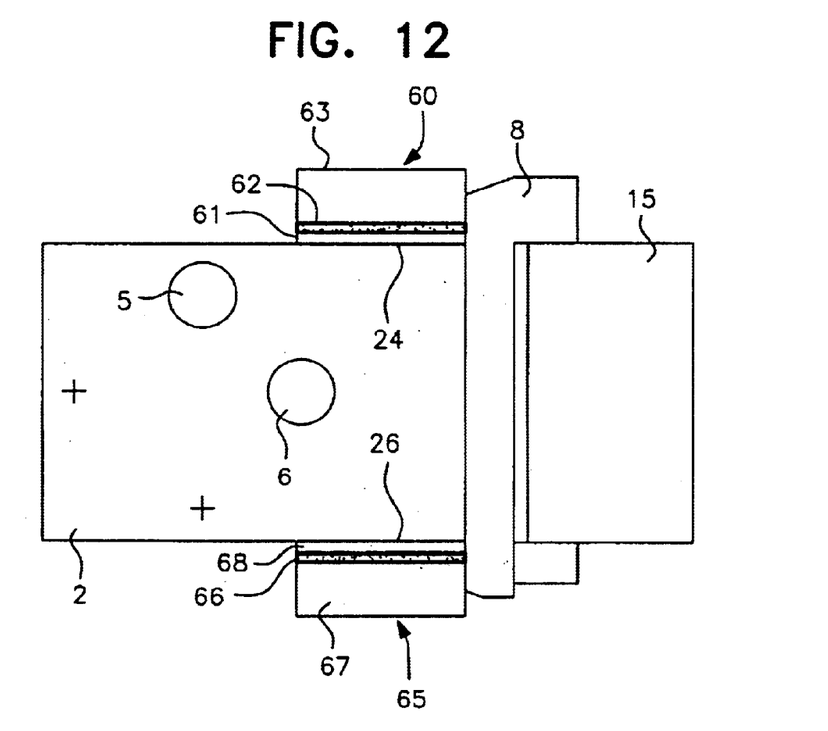
FIG. 12 is a schematic view of the leveling head, according to FIG. 11, without wire erosion machine parts.

FIGS. 11 and 12 show vibration dampers of the third type for the leveling head according to FIG. 1. Here are two vibration dampers 60, 65, of which the vibration damper 60 is affixed on the side face segment 24 of the upper part 2, and the vibration damper 65 is affixed to the opposite side face segment 26 of the upper part 2. Both vibration dampers are affixed in the immediate vicinity of the precision vise 8. A flat anchoring plate 61, whose outer face is provided with a plate-shaped damper 62 made of rubbery material, is screwed to the side face segment 24. The external face of the damper 62 bears a solid block 63. As an alternative, the solid block 63, for example, in the shape of a solid steel ball, can be embedded into the material of the damper 62. The solid block has a low natural frequency as compared to the vibrations excited in the upper part 2 so that it can absorb the vibration energy of the upper 2. It is obvious that the vibration damper 60, affixed on the side of the upper part 2, does not increase the height of the leveling head 1 so that the effective working area is not decreased.

The vibration damper 65 is constructed exactly like the vibration damper 60. Hence, a solid block 67 is permanently connected over a plate-shaped damper 66 to the outside of an anchoring plate 68, which is screwed to the outer face segment 26. The insertion of the anchoring plates 61, 68 between the damper 62, 66 and the solid block 63, 67, on the one hand, and the upper part 2, on the other hand, makes it possible to replace the vibration dampers 60, 65 so that their natural frequency, their damping characteristics and their dimensions can be adjusted to the individual application.

Optionally, the two vibration dampers 60, 65 can also be connected directly at the top and bottom of that part of the workpiece 15 that is not machined by the erosion wire 12 and is located, for example, between the jaws 9, 11 of the precision vise 8.

Figure 13:
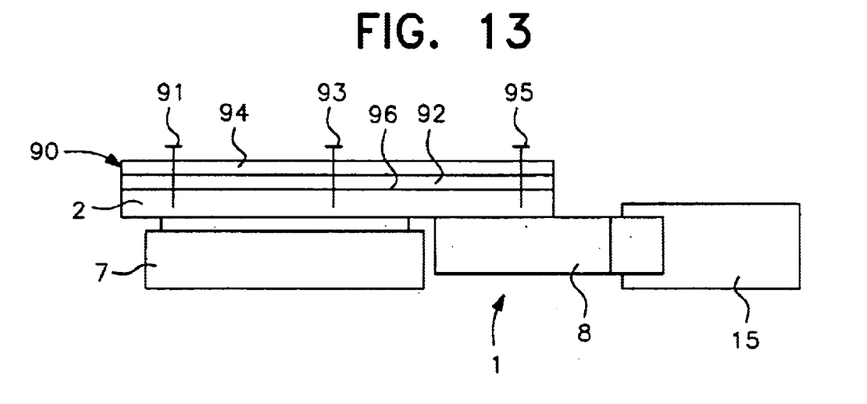
FIG. 13 is a schematic side view of a leveling head according to an alternative of the invention.

Finally, FIG. 13 shows a vibration damper 90 of the fourth type for the holder, i.e., in the present application case for the upper part 2 of a leveling head 1. The vibration damper 90 comprises a package of several flat plates of the same size, here the plates 92, 94, which are permanently connected together by means of screwing or cementing as well as connected to the top side of the upper part 2 with screws 91, 93, 95. The plate package extends parallel to the top side of the upper part 2 and is in essence just as large as said upper part. The vibration damping effect is the result of the plates 92, 94, which are loaded in shear when the upper part 2 vibrates, rubbing against each other. The plates can be made of metal or a harder plastic. The vibration damping effect can also be increased by inserting another thin plate 96 with a high coefficient of friction between the plate 92, adjacent to the upper part 2, and the top face of the upper part.

Furthermore, the invention provides that the upper part 2 itself can be segmented by the metal sheets in that said upper part is produced from a package of plates 92, 94, corresponding to a sandwich-like package of metal sheets. The top faces of the metal sheets that face each other can be roughened in order to increase the coefficient of friction; or a friction plate, corresponding to plate 96, can be inserted.

Figure 14:
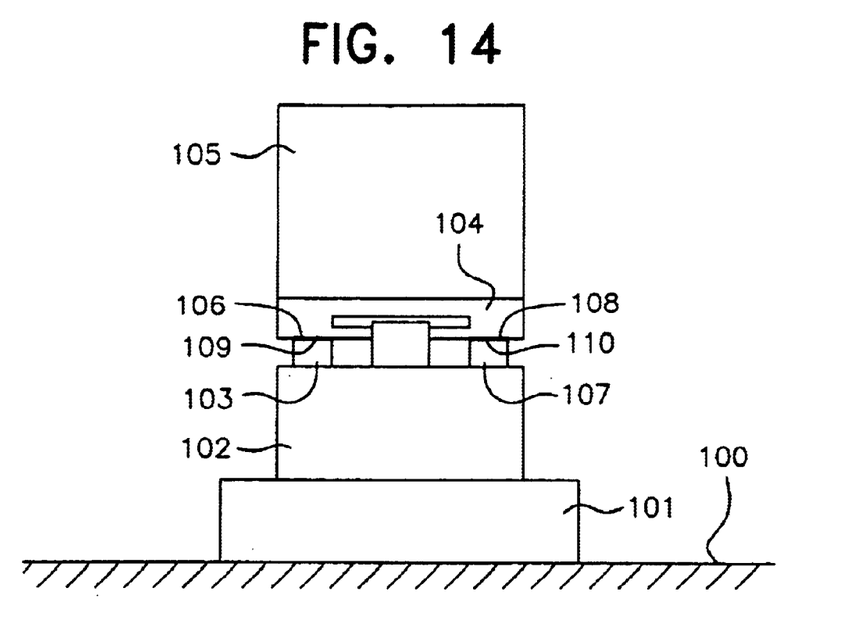
FIG. 14 is a schematic view of a machine chuck with workpiece holder with a vibration damper of the second type.

FIG. 14 depicts a pallet 101 as another embodiment of the invention. The pallet is mounted on a machine table 100 and bears a machine chuck 102. In this chuck 102, a workpiece holder 104, which carries the workpiece 105, is clamped. The chuck 102 and the workpiece holder 104 can be designed like the one described in U.S. Pat. No. 4,855,558. Thus, the top side of the workpiece or tool holder 104, facing the chuck in the clamped state, exhibits flat surface segments, referred to here with reference numerals 106, 108. When clamped, these flat surface segments rest against free front faces (axial reference surface) of pins 103, 107, projecting from the chuck 102. According to the invention, the free front faces of the pins 103, 107 are provided with a vibration damper 109, 110 in the shape of an applied HDCM alloy, as described above. Said alloy prevents the axial reference surfaces from vibrating or at a minimum significantly dampens their vibration. This alloy is affixed expediently by spraying under a vacuum in a thickness of less than 2 mm and can then be ground to produce a reference surface. Simpler embodiments do not need grinding. The chuck 102 is defined as a holder in accordance with the invention.

Figure 15:
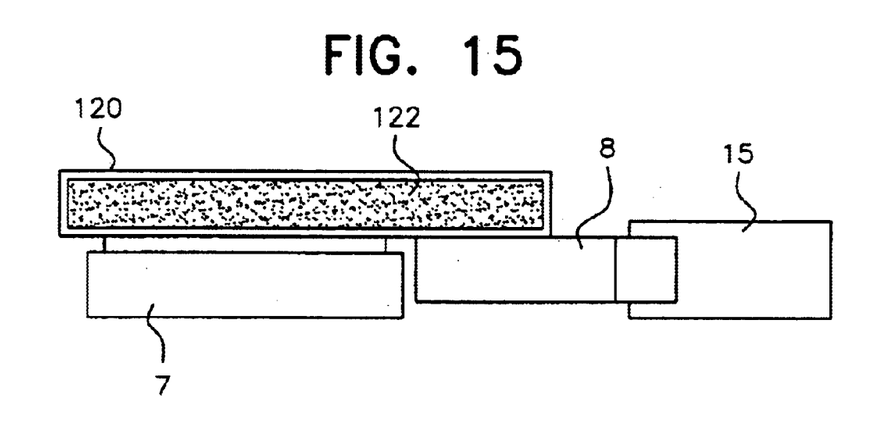
FIG. 15 is a schematic side view of a leveling head with a vibration damper of the second type.

FIG. 15 is a schematic drawing of a side view of a leveling head, which is provided with another embodiment of a vibration damper of the second type. The upper part 120 clamped on the lower part 7 is made of an open cell, porous material, for example, a metallic cast part, whose cells are filled almost completely with insulating material. In addition, the finished casting is dipped into a caoutchouc or rubber solution. After saturating the casting with the solution, the solvent is driven out through thermal treatment so that the rubber is vulcanized into the casting. The mechanical strength of the upper part 120 is provided by the casting; and the cured on rubber 122 dampens the vibration. In an alternative embodiment, the upper part 120 can be made of a solid metal box, in whose hollow interior is fastened an insulating material, for example, in the form of a cured on rubber, rubber balls or rubber packages.

Figure 2:
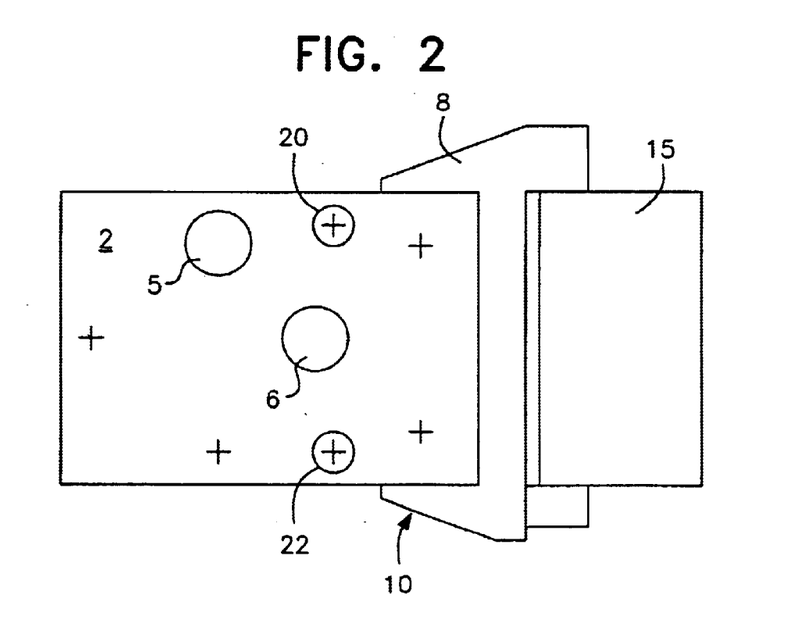
FIG. 2 is a schematic top view of the leveling head, according to FIG. 1, with vibration dampers.

The above description of the invention embodiments with reference to a leveling head as an example of a holder explains four basically different types of vibration dampers, which can be used in accordance with the invention. The first type of vibration dampers 30, 40, depicted in FIGS. 2 to 4, provides that a damper 38, 48 made of rubber or a rubbery material is inserted between two objects, here the screw 32 or the screw head 44 and the bolt 36 or the pin 49, of which one part 32, 44 is set oscillating relative to the other part 36, 49, here by means of the rinse fluid pressure, which acts on the workpiece 15, which is permanently connected to the upper part 2. Here the damping capacity and the spring constant of the damper 38, 48 can be adjusted in the radial and axial direction through choice of material and its dimensions so that the natural frequency of the system, comprising damper 38, 48, upper part 2 and workpiece 15, is far away from the natural frequency of the vibrations excited by the rinse fluid.

The second type of vibration damper is depicted by FIGS. 5 to 10, where the dynamic properties of the holder 10 may be regarded as those of a solid material, for example, a solid beam. Hence, there is no relative movement of two objects relative to each other. Here it suffices to affix a damper 50 made of a solid material with internal damping capability, for example, rubber, on the outside of the holder 10.

In the third type of vibration damper according to FIGS. 11 and 12, the damper 62, 66 is connected to a mass (solid blocks 63, 67), which allows the damping characteristics to be adjusted in a very simple manner to each individual application, for example, to different rinse fluid pressures. In this respect, the same rubbery material can be used. Furthermore, the vibration damper 60, 65 can be dimensioned in such a manner that it can be installed as close as possible to the region, where the vibration is generated. It is clear from FIG. 11 that the spatial conditions in a wire erosion machine 13, 14 are quite limited, especially in the z direction. Here the arbitrary shape dimensions of the vibration damper 60, 65 are especially advantageous in that its application does not require more space for the holder 10 in the z direction.

Finally, the fourth type of vibration damper according to FIG. 13 exploits the frictional forces between connected plates or metal sheets to absorb the vibration energy.

Figure 16:
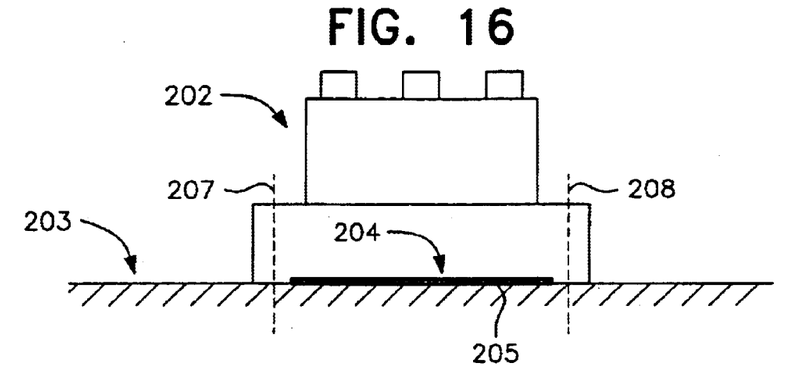
FIG. 16 is a schematic side view of a holder in the form of a machine chuck with support structure.
Figure 17:
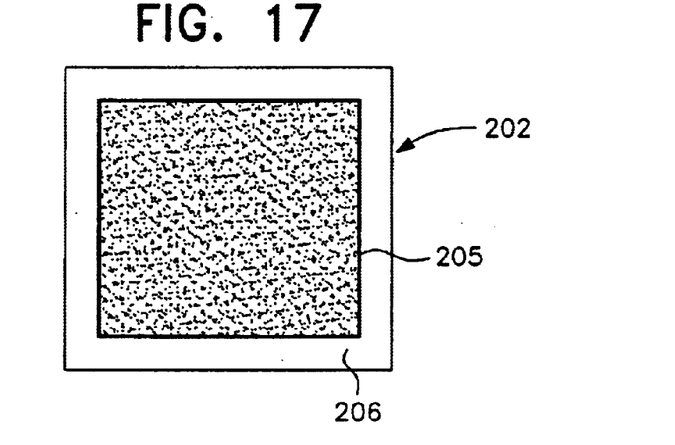
FIG. 17 is a view of the underside of the holder from FIG. 16.

Turning next to the various embodiments of FIGS. 16–24, according to FIG. 16, a conventional machine chuck 202 is fastened on a support structure 203 in the form of a machine table, for example, with bolts, which are not illustrated in detail. The underside of the machine chuck faces the machine table 203 and is depicted in FIG. 17. The underside of the machine chuck 202, which is depicted with a square cross section in the illustrated example, has a square recess 204 into which is inserted, for example, cemented, a vibration damper 205 in the form of an insulating sheet, as described in detail above. The exposed surface of the insulating sheet 205 does not project beyond the cohesive, flat contact surface 206, which completely surrounds the insulating sheet 205. The contact surface 206 has the shape of a square ring.

It is easy to see from FIG. 16 that the machine chuck 202 with the contact surface 206 sits directly on the surface of the machine table 203 that is flat at least in the area of the contact surface 6 so that the insulating sheet 205 totally disappears under the machine chuck 202. Fastening bolts penetrate the machine chuck 202 along the dashed line 207, 208 so that they project beyond the contact surface 206 and penetrate into the aligned blind boreholes in the machine table 203. The insulating sheet 205 damps vibrations in the machine chuck 202, which is to be regarded as the holder in the context of the claims. Furthermore, the possibility of passing the vibrations from the machine chuck 202 to the machine table 203 is limited to the relatively small contact surface 206.

Figure 18:
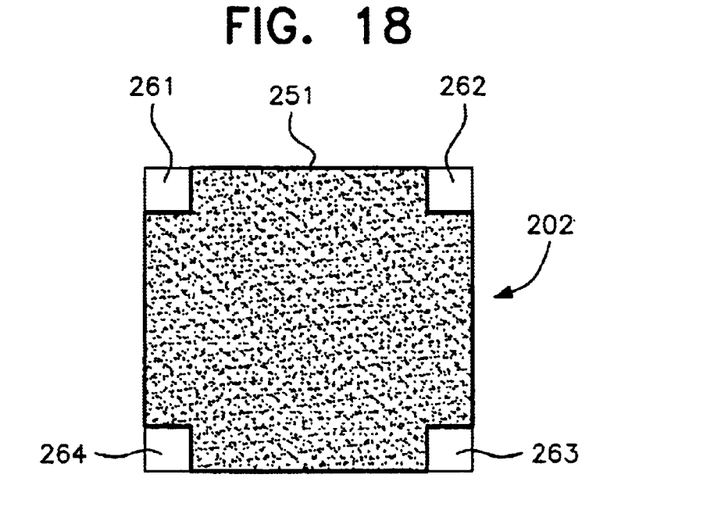
FIG. 18 is a view of the underside of the holder in a modified embodiment.

The size of the contact surface 206 can be reduced even further by limiting said contact surface, according to FIG.

18, to the four corner areas of the underside of the machine chuck 202. This results in the four contact surfaces 261, 262, 263 and 264, which are spaced apart on alternative sides and between which extends the insulating sheet 251 in a corresponding recess from the underside of the chuck. It is especially apparent from this embodiment of the invention that, on the onehand, the stationary rigid connection between the machine chuck 202 and the machine table 203 is guaranteed by means of screw connections in the contact surfaces 261, 262, 263, 264 and, on the other hand, very good vibration damping is achieved by means of the intercalated insulating sheet 251.

An identical embodiment of the invention is provided, when a workpiece holder is used, instead of the machine chuck; and a workpiece, to be connected to the workpiece holder, is used, instead of the machine table.

Figure 19:
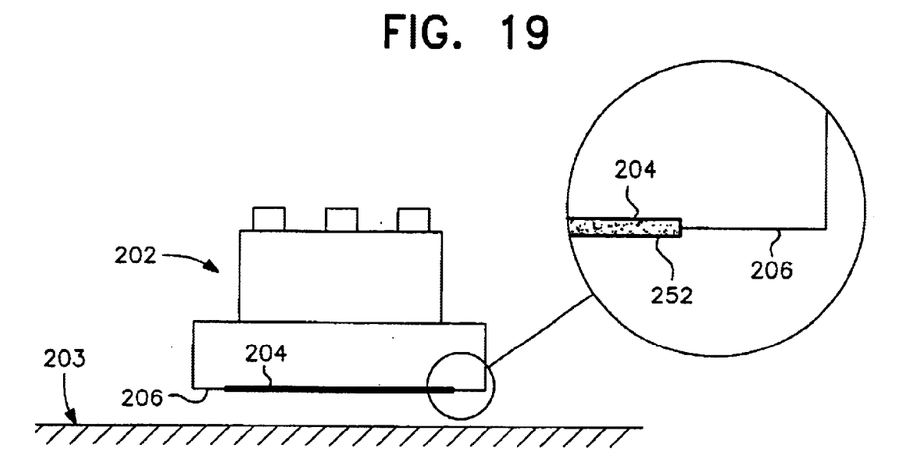
FIG. 19 is a schematic side view of another embodiment of the holder, according to FIG. 16, before fastening to the support structure.
Figure 20:
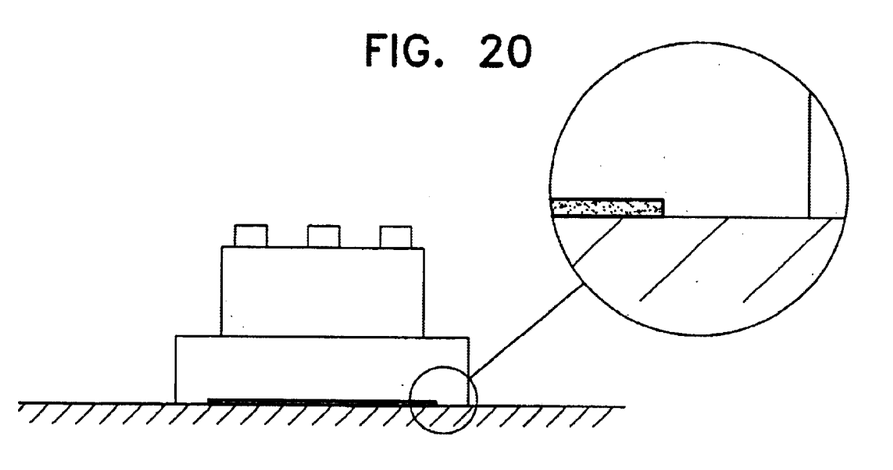
FIG. 20 is a view, according to FIG. 19, with the holder, fastened on the support structure.

FIGS. 19 and 20 depict an embodiment of the invention wherein table 203 in the design, described with reference to FIGS. 16 to 18, serves as the holder of the machine chuck 202 and as the support structure. Into the recess 204 is inserted, at variance with the previously explained embodiments, an insulating mat 252, whose thickness is greater than the depth of the recess 204, said depth being measured from the contact surface 206. Consequently, the insulation mat 252, which is inserted into the recess 204 and corresponds to FIG. 19, projects beyond the contact surface 206 as long as the machine chuck 202 is not connected to the machine table 203.

If the machine chuck 202 is bolted in the explained manner to the contact surface 206 with the surface of the support structure 203, the insulation mat 252 is compressed at right angles to its longitudinal expansion, as shown in FIG. 20. Thus, the insulation mat 252 is given a specified pretension, which has a positive effect on its damping property.

Figure 21:
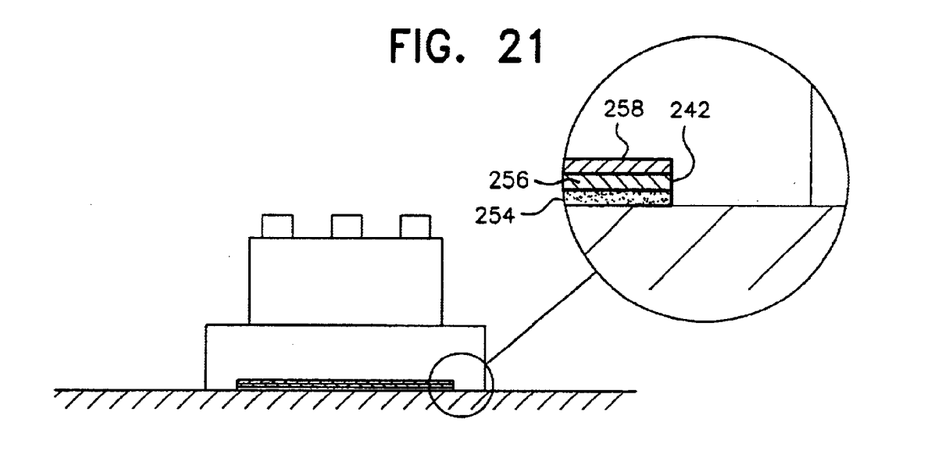
FIG. 21 is a schematic drawing of another embodiment of a vibration damper.

In the embodiment of the invention according to FIG. 21, the adjustability of the damping property of an insulation mat 254 is attained in that two shims 258, 256 are inserted from the inside to the outside into the here deeper recess 242 in the underside of the machine chuck 202 below the insulation mat 254. The shims 256, 258 can exhibit different damping properties and can thus be selected as a function of the frequency of the vibrations, acting on the machine chuck 202.

Figure 22:
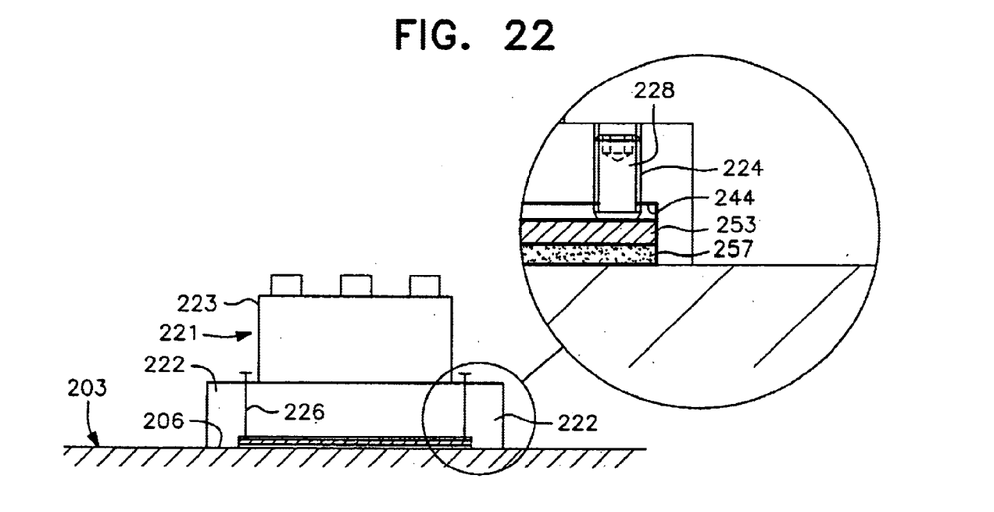
FIG. 22 depicts a variation of the vibration damper.

In the embodiment of the invention according to FIG. 22, the desired damping property of the insulation mat 257, inserted into a deeper recess 244, is adjusted by means of a rigid pressure plate 253, which rests from the inside flat against the insulation mat 257. The machine chuck 221 exhibits on its side, facing the support structure 203, a radial expansion 222, whose radial stretch is greater than that required for the contact surface 206. Thus, there is the possibility of inserting into the expansion 222 in the vicinity of the superstructure 223, forming the actual chuck, at least two threaded boreholes 224, 226, which empty into the recess 244 and into which a pressure pin 228, provided with an external thread, can be screwed. The pressure pin 228 rests against the surface, which is opposite the insulation mat 251 and belongs to the pressure plate 253. By continuing to screw into the borehole 224, the pressure, exerted over the pressure plate 253 on the insulation mat 251, can be increased, as desired, when the machine chuck 221 is bolted together with the support structure 203 in the described manner. In this manner, the pretension, desired in the insulation mat 251, can be adjusted by choice.

Of course, the pressure bolt 228 can also be replaced by a piston cylinder unit, which is to be operated hydraulically.

Figure 23:
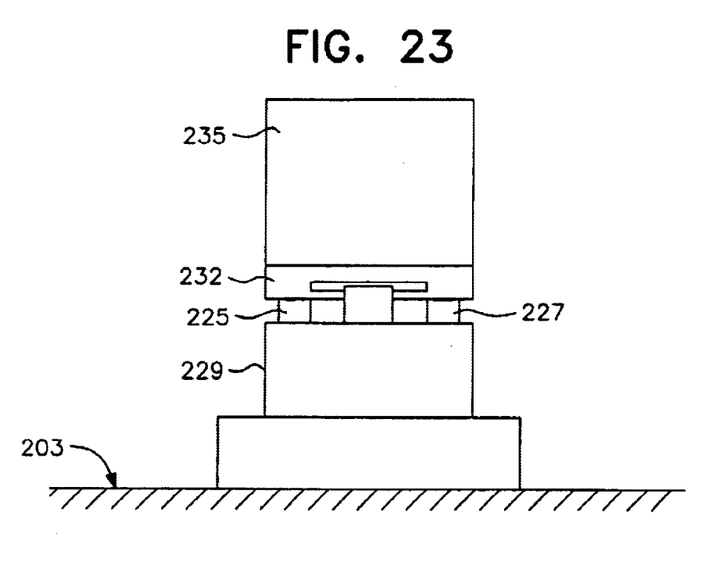
FIG. 23 is a side view of another embodiment of the invention.

Finally, FIG. 23 depicts an embodiment of the invention wherein it is not necessary that the holder, here in the form of a machine chuck 229, must be bolted together with a workpiece holder 232 to the contact surfaces. The machine chuck 229 of the type under discussion here is described, for example, in the document EP-B 0255042 (U.S. Pat. No. 4,855,558) and is labeled there with the reference numeral 1. The workpiece holder 232 belongs to the class disclosed and illustrated in the said patent as an electrode holder 2. From the patent it is known that the machine chuck includes a central tensioning device, which is not illustrated here and with which the workpiece holder 32 can be rigidly clamped to the machine chuck 229. In the clamped state of the workpiece holder 232, the columns 225 and 227, projecting on the face side beyond the machine chuck 229, rest against flat surface areas of the workpiece holder 232. As shown in FIG. 23, each of the columns 225, 227 is provided on the respective exposed face with a recess, into which is inserted an insulating material in the manner described above. The recess is surrounded by a here circular contact surface, with which the respective column 225, 227 rests against the flat upper side of the workpiece holder 232. The inserted insulating material prevents or at least renders difficult the transmission of vibrations from the workpiece 235, connected to the workpiece holder, over the workpiece holder 232 to the machine chuck 229.

Figure 24:
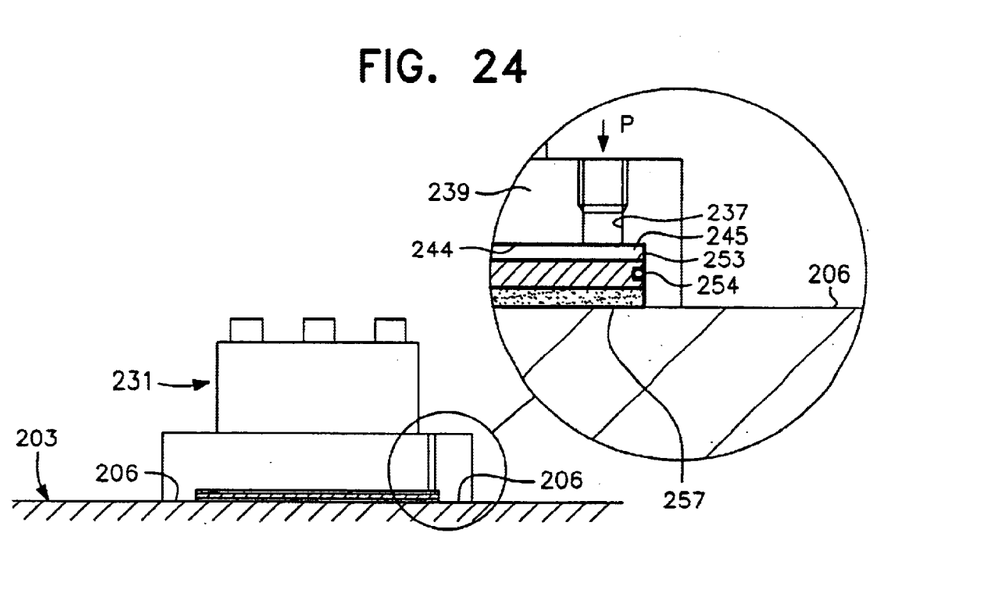
FIG. 24 is a schematic side view of another modified embodiment.

In the embodiment according to FIG. 24, the holder 231 in the form of a machine chuck is provided on its face, facing the support structure 203, with a radial extension 239, which exhibits an axial through borehole 237 for compressed air or pressurized oil. Inside the recess 244 there is a pressure chamber 245, which communicates with the through borehole 237 and which is defined in the direction of the outside by the pressure plate 253, provided with a ring seal 254. The pressure plate 253 rests flat against the rear side of the insulation mat 257, which closes with the annular contact surface 206 in the outward direction. Not illustrated is an attachment of the through borehole 237 to a controllable pressure medium source.

After the holder 231 with its contact surface 206 has been mounted on the support structure and bolted together with the contact surface 206, the pressure chamber 245 can be pressurized so that the insulation mat 257 is put under a specific pretension that changes its damping property in the desired manner in proportion to the unloaded state.

For the vibration damper suitable materials are those described above with reference to the embodiments of FIGS. 1–15. In addition, it is recommended that a liquid or grease be enclosed into the insulation mat 257.

We claim:

1. A machine chuck for accurate positioning of a workpiece holder in the working area of a machine tool, said machine chuck including attachment elements for attaching said machine chuck to a machine table and holding elements for holding the workpiece holder, wherein said machine chuck includes a vibration damper in the form of a planar insulating foil of vibration absorbing material facing a planar surface within said machine chuck.

2. The machine chuck of claim 1 wherein said vibration damper has sufficiently high damping properties to damp vibrations imposed on said machine chuck.

3. The machine chuck of claim 1 wherein said vibration absorbing material is rubber or a rubbery-like material.

4. The machine chuck of claim 3 wherein the thickness of said insulating foil is substantially less than any dimension of the planar surface of the insulating foil.

* * * * *